(12) United States Patent
Obara

(10) Patent No.: US 6,916,160 B2
(45) Date of Patent: Jul. 12, 2005

(54) AXIAL ELECTRIC FAN BLOWER WITH ELECTRIC COMPONENTS HOUSING SEALED FROM MOISTURE, DIRT AND DUST OR OTHER HARMFUL GAS

(75) Inventor: Rikuro Obara, Miyota-machi (JP)

(73) Assignee: Minebea Kabushiki-Kaisha, Nagano-ken (JP)

( * ) Notice: Subject to any disclaimer, the term of this patent is extended or adjusted under 35 U.S.C. 154(b) by 0 days.

(21) Appl. No.: 09/804,198

(22) Filed: Mar. 13, 2001

(65) Prior Publication Data

US 2001/0036416 A1 Nov. 1, 2001

(30) Foreign Application Priority Data

Apr. 28, 2000 (JP) ........................................ 2000-129176

(51) Int. Cl.⁷ ................................................ F04B 35/04
(52) U.S. Cl. ................ 417/354; 417/423.7; 417/423.14
(58) Field of Search .............................. 417/353, 354, 417/423.1, 423.7, 423.14, 15; 361/688, 701; 418/136, 137; 416/110, 246, 247 R, 246 R

(56) References Cited

U.S. PATENT DOCUMENTS

| | | | | |
|---|---|---|---|---|
| 3,229,897 A | * | 1/1966 | Papst | 417/354 |
| 3,561,891 A | * | 2/1971 | Saint-Amand | 417/353 |
| 3,826,047 A | * | 7/1974 | Binder | 51/277 |
| 4,482,302 A | * | 11/1984 | Grignon | 417/354 |
| 4,659,290 A | * | 4/1987 | Kundert | 417/32 |
| 4,663,549 A | * | 5/1987 | Suzuki | 310/62 |
| 4,799,858 A | * | 1/1989 | Shin-Chin | 416/110 |
| 4,997,296 A | * | 3/1991 | Narita et al. | 384/492 |
| 5,099,181 A | * | 3/1992 | Canon | 417/354 |
| 5,267,842 A | * | 12/1993 | Harmsen et al. | 417/423.14 |
| 5,436,519 A | | 7/1995 | Takahashi et al. | 310/217 |
| 5,492,458 A | | 2/1996 | Horng | 417/423.7 |
| 5,613,833 A | * | 3/1997 | Wolfe et al. | 416/246 |
| 5,967,671 A | * | 10/1999 | Obara | 384/504 |
| 5,971,725 A | * | 10/1999 | de Simon et al. | 417/423.1 |
| 5,997,267 A | | 12/1999 | Lee | 417/423.7 |
| 6,270,320 B1 | * | 8/2001 | Heyder et al. | 417/423.1 |
| 6,278,207 B1 | * | 8/2001 | Matsumoto | 310/88 |

FOREIGN PATENT DOCUMENTS

| | | | | |
|---|---|---|---|---|
| EP | 0 310 391 A | 4/1989 | | F04D/25/06 |
| EP | 0 688 088 A | 12/1995 | | H02K/5/22 |
| EP | 0 771 002 A | 5/1997 | | G11B/21/12 |

* cited by examiner

*Primary Examiner*—Charles G. Freay
(74) *Attorney, Agent, or Firm*—Israel Gopstein

(57) ABSTRACT

The object of the present invention is to provide a blower in which electrical components such as printed circuit board or electronic parts are isolated from the wind flowing through the blower to protect these components from moisture, dirt, dusts, or other harmful gas or substance contained in the wind, and to prevent the degradation of the insulating property such as the electric insulation or dielectric strength.

A blower having an impeller 6 adapted to be rotated by means of a motor 3 comprises a base 4 for supporting the motor 3, the base is provided and supported at the central portion of a frame 1 through stays 2, a chamber 11 for accommodating electrical components formed in the base, the back portion of the chamber is adapted to be sealed by a removable cover 10, wherein the chamber for accommodating electrical components is formed by the base 4 having a flange 4a extending backward from the outer periphery thereof to form a cylindrical body with a bottom, the chamber has an opening at the rear thereof, and the rear opening of the base is occluded by the cover 10 detachably mounted by screws on the base 4.

5 Claims, 4 Drawing Sheets

F I G. 1
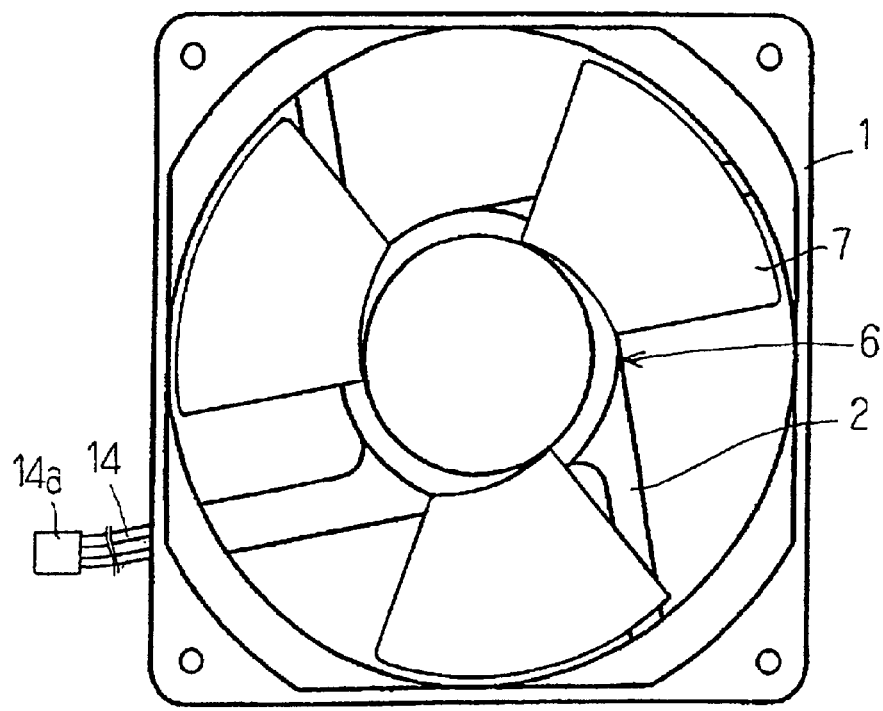
F I G. 2
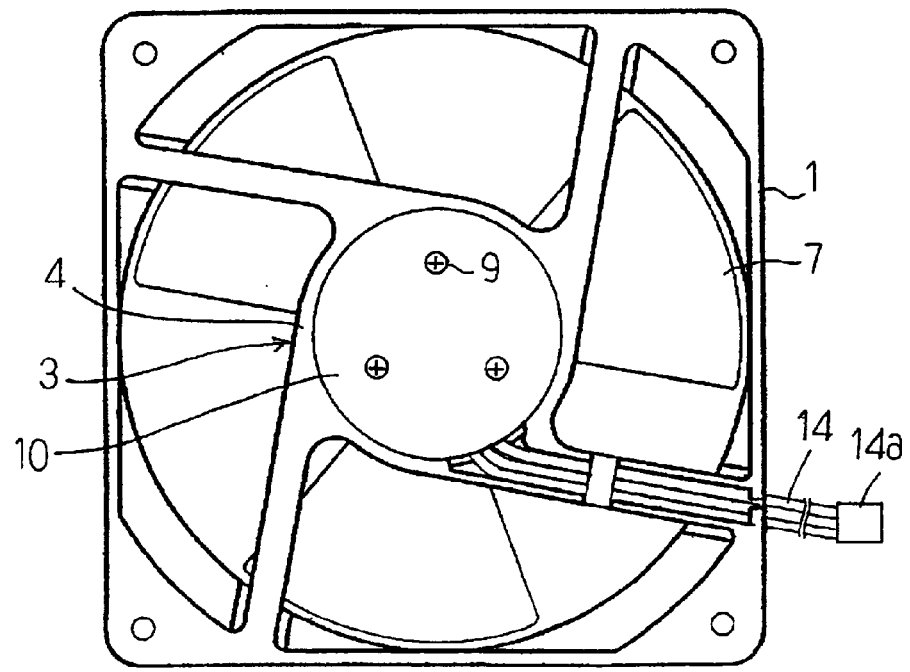

US 6,916,160 B2

AXIAL ELECTRIC FAN BLOWER WITH ELECTRIC COMPONENTS HOUSING SEALED FROM MOISTURE, DIRT AND DUST OR OTHER HARMFUL GAS

BACKGROUND OF THE INVENTION

The present invention relates mainly to a blower suitable in the application for cooling office automation equipments.

DESCRIPTION OF THE PRIOR ART

The blower for cooling the office automation equipments has for example a structure as shown in FIG. 5 in which the blower includes a base 33 provided and supported at the central portion of a frame 31 by means of stays 32, a rotor member 35 rotatably journalled by means of a bearing apparatus 34 provided on the front side of the base at the central portion thereof, and an impeller 37 having a plurality of blades 36 provided on an outer peripheral flange 37a, the impeller is mounted on the rotor member 35.

A printed circuit board 39 including electrical components 38 for controlling the motor is secured to an iron core holder 40a of a stator 40 by means of screws 41a, and is accommodated within a parts storing portion 42 surrounded by a flange 33a extending forward from the outer periphery of the base 33.

The reference numeral 43 is added to a magnet or magnets mounted on the inner surface of the outer peripheral flange of the rotor member 35 so as to opposite to the outer peripheral surface of the stator.

In the above described blower, the impeller 37 will rotate upon energizing the motor, and at least a portion of thus produced wind penetrates through a clearance A defined between a rear end edge of the outer peripheral flange 37a of the impeller 37 and a front end edge of the outer peripheral flange 33a of the base 33 into the motor.

In this connection, there is a disadvantage that moisture, dirt, dusts, or other harmful gas or substance contained in the wind penetrate into the base of the motor to impair the insulating property of the electrical components such as printed circuit board 39 or electronic parts 38, i.e. these components are impaired in their electric insulation or dielectric strength.

Accordingly the object of the present invention is to provide a blower in which electrical components such as printed circuit board or electronic parts are isolated from the wind flowing through the blower to protect these components from moisture, dirt, dusts, or other harmful gas or substance contained in the wind, and to prevent the degradation of the insulating property such as the electric insulation or dielectric strength of these components.

SUMMARY OF THE INVENTION

These and other objects are achieved by a blower having an impeller adapted to be rotated by means of a motor in accordance with claim 1, the blower comprising:

a base for supporting the motor, the base is provided and supported at the central portion of a frame by means of stays; and a chamber for accommodating electrical components formed in the base, the back portion of the chamber is adapted to be sealed by a removable cover.

The blower in accordance with claim 2 having an impeller adapted to be rotated by means of a motor, the blower comprising:

a base for supporting the motor, the base is provided and supported at the central portion of a frame by means of stays;

a bearing apparatus for supporting a central portion of the impeller, the bearing apparatus including:

a sleeve, a stepped shaft including a larger diameter portion and a reduced diameter portion, the first raceway formed at an appropriate position around the outer peripheral surface of the larger diameter portion, the second raceway formed on an inner peripheral surface of the sleeve so as to correspond with the first raceway, balls of a first row interposed between the first and second raceways, an inner ring fit over the reduced diameter portion of the shaft and secured thereto, the third raceway formed around an outer peripheral surface of the inner ring, the fourth raceway formed on the inner peripheral surface of the sleeve so as to correspond with the third raceway, and balls of a second row interposed between the third and fourth raceways, and a chamber for accommodating electrical components formed in the base, the back portion of the chamber is adapted to be sealed by a removable cover, and the balls of the first and the second rows of the bearing apparatus are made of ceramic material.

The chamber for accommodating electrical components is formed by the base having a flange extending backward from the outer periphery thereof to form a cylindrical body with a bottom, the chamber has an opening at the rear thereof, and the rear opening of the base is occluded by the cover detachably mounted by screws on the base.

BRIEF DESCRIPTION OF THE DRAWINGS

Further feature of the present invention will become apparent to those skilled in the art to which the present invention relates from reading the following specification with reference to the accompanying drawings, in which:

FIG. 1 is an elevational view showing the blower in accordance with the present invention;

FIG. 2 is a rear elevation showing the blower in accordance with the present invention;

DETAILED DESCRIPTION OF THE PRESENT INVENTION

Figure 3:
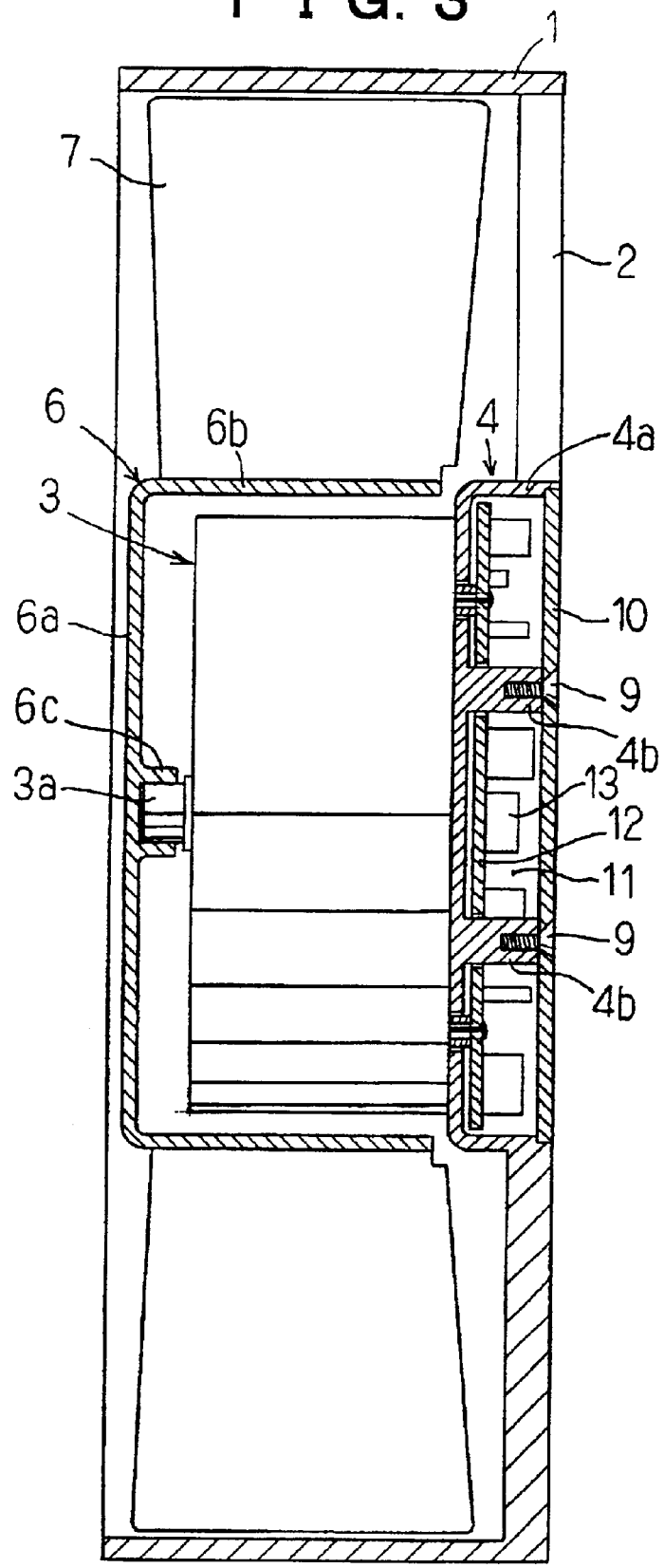
FIG. 3 is a longitudinal cross sectional view showing the blower in accordance with the present invention.

An embodiment of the blower in accordance with the present invention will now be described in detail with reference to the concrete example thereof illustrated in the attached drawings.

A blower body or a frame 1 of synthetic resin includes a base 4 supported integrally therewith at the central portion thereof through a few stays 2. A motor 3 is mounted on the front side of the base 4.

A distal end of a spindle shaft 3a of the motor 3 is fit and secured in a central hub 6c protruding backward from a front face plate 6a of an impeller 6. The impeller 6 includes the front face plate 6a, a flange 6b extending backward from the outer periphery of the plate, and a suitable number of blades 7 provided around the outer periphery of the flange.

The base 4 has a flange 4a extending backward from the outer periphery thereof to form a cylindrical body with a bottom having an opening at the rear end thereof. The cylindrical body is occluded by a cover 10 to define a sealed chamber 11 for accommodating electric components. The accommodating chamber is adapted to accommodate the electrical components such as the printed circuit board 12 or other electronic parts 13.

A plurality of internally threaded bosses 4b are extending backward (rightwards in the drawings) from the bottom of the base 4 to detachably mount the cover 10 to the base by threadably engaging screws 9 with the internal threads of the bosses.

The reference numeral 14 is added to leads to the printed circuit board, and the reference numeral 14a is added to a connector of the leads 14.

Figure 4:
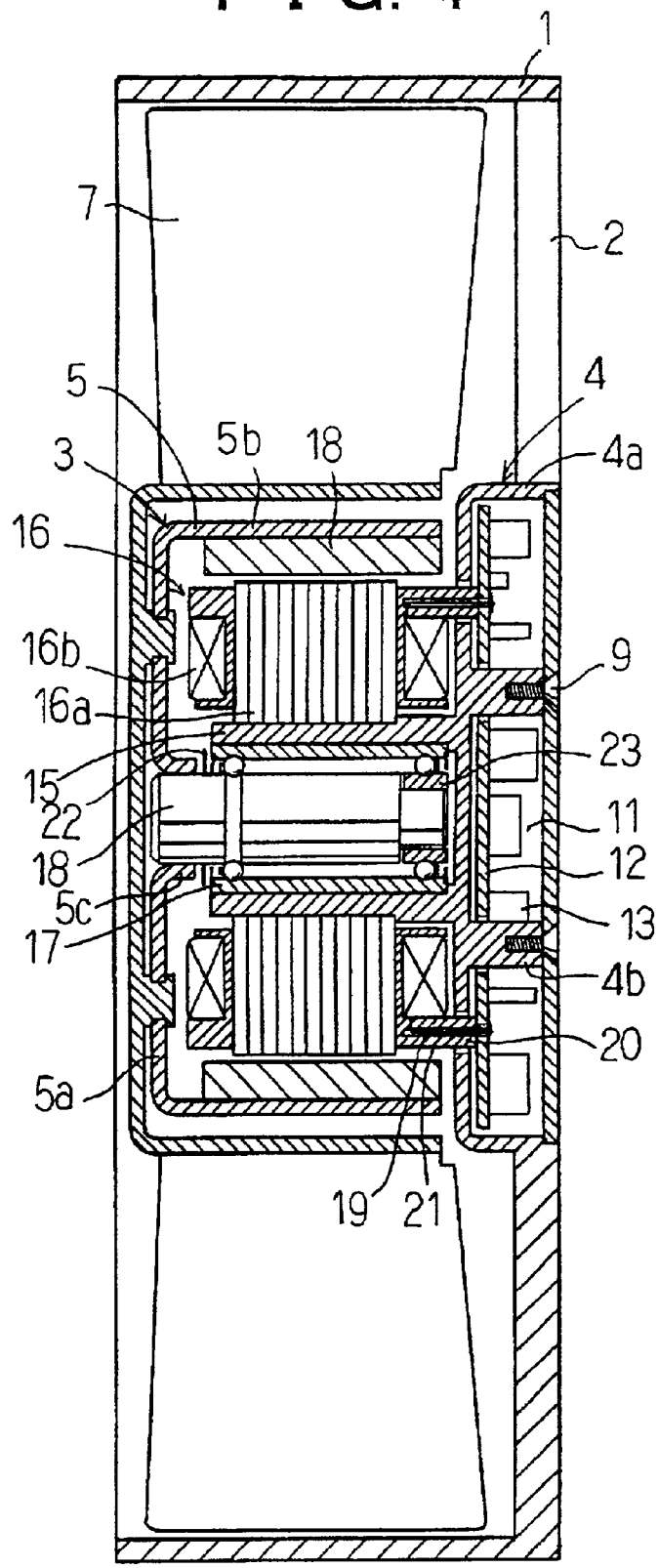
FIG. 4 is a longitudinal cross sectional view showing one example of the blower in accordance with the present invention equipped with a motor of an outer rotor type.
Figure 5:
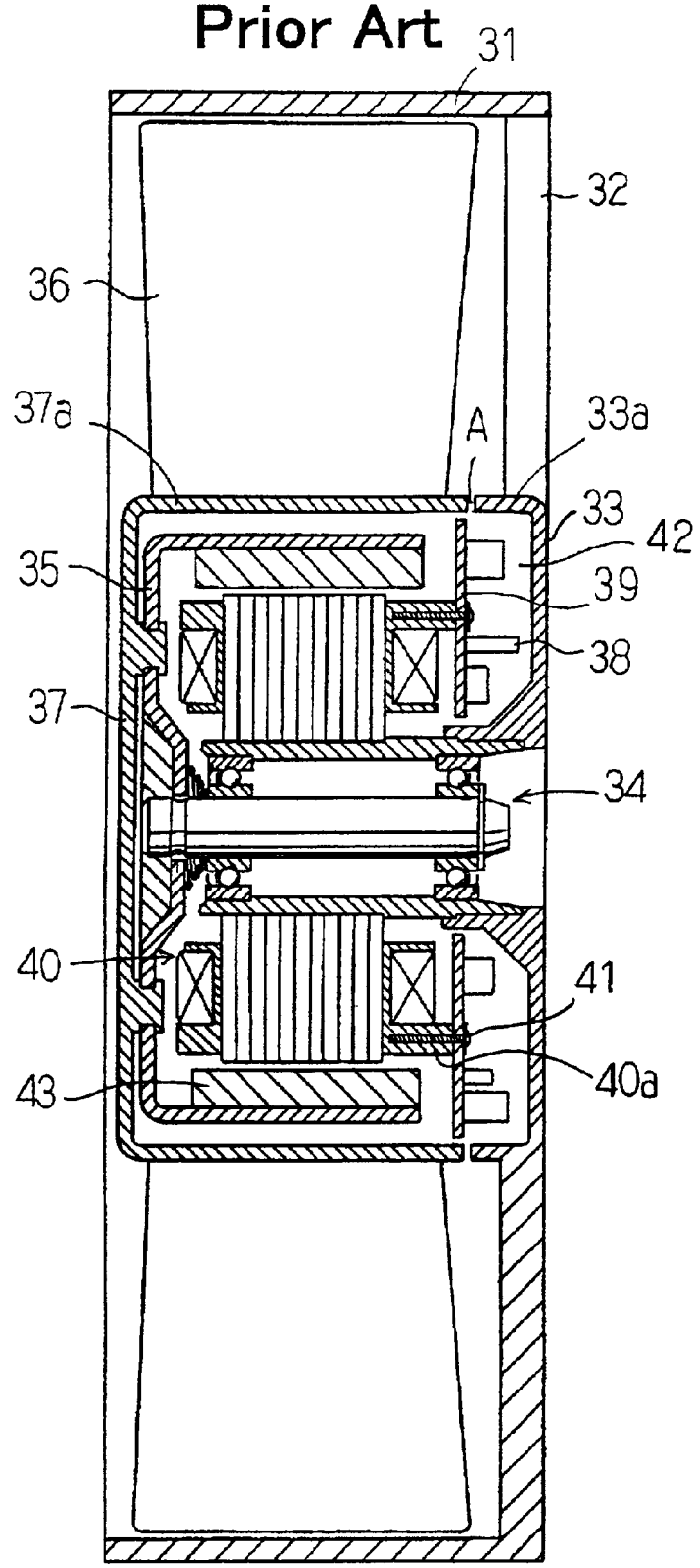
FIG. 5 is a longitudinal cross sectional view showing the blower of the prior art.

Motors of a variety of structure can be employed for the above described blower. An example of the blower including a motor of an outer rotor type is shown in FIG. 4.

The base 4 has a sleeve-like bearing holder 15 formed integrally therewith to extending forward (leftwards in the drawings) therefrom. The bearing holder 15 is provided therearound with a stator 16 comprising an iron core 16a and a coil 16b. Further, a sleeve 17 forming an outer ring is accommodated within the bearing holder 15.

The sleeve 17 includes a spindle shaft 18 to be journalled by means of a bearing apparatus as described hereinbelow. A distal end of the spindle shaft protruding from the sleeve 17 fit within a hub 5c extending from a central aperture formed on a front face plate 5a of a yoke 5 and secured thereto.

The yoke 5 has a flange 5b extending backward from the outer periphery of the front face plate 5a. A magnet or magnets 18 corresponding to the stator 16 are provided on the inner peripheral surface of the flange. An impeller 6 is secured to the front face plate 5a of the rotor member 5 by means of rivets 8 or any other means.

A lead wire 19 led to the coil 16b of the stator 16 extends through a bore formed through a leg 21 of an iron core holder 20 of the stator to the circuit formed on the printed circuit board 12 and connected thereto.

The reference numeral 22 is added to a washer of synthetic resin mounted around the spindle shaft 18 for preventing the dirt or dusts from entering into the bearing apparatus.

The bearing apparatus of variety of structure can be adopted for journaling the spindle shaft 18. The bearing apparatus of this embodiment comprises a stepped shaft 18 including a larger diameter portion and a reduced diameter portion, an inner ring 23 fit and secured over the reduced diameter portion of the shaft, the first raceway formed around the outer periphery of the larger diameter portion, the second raceway formed on the inner peripheral surface of the sleeve 17, a plurality of balls of metallic or ceramic material for the first row interposed between the first and second raceways, the third raceway formed around the outer periphery of the inner ring 23, the fourth raceway formed on the inner peripheral surface of the sleeve, and a plurality of balls of metallic or ceramic material for the second row interposed between the third and fourth raceways.

The balls of the first and second row are equal in their diameter. The balls of ceramic material are higher in their hardness, and good at their wear resistance and durability.

The blower including the bearing apparatus to which balls of ceramic material are incorporated can be used in the high rotation region, and can be operated relatively quietly.

EFFECTS AND ADVANTAGES

The blower in accordance with the present invention is provided at the rear side of the base with a chamber for accommodating electrical components so that the printed circuit board or electronic parts can be protected from moisture, dirt, dusts, or other harmful gas or substance contained in a wind produced through the wind tunnel portion, and the degradation of the insulating property such as the electric insulation or dielectric strength can be avoided. Thus, the reliability of the blower or the equipment incorporated within the blower can be enhanced.

The blower claimed in claim 2 is provided with the bearing apparatus including a stepped shaft having a row of a raceway which is formed directly on the larger diameter portion thereof. In this connection, a conventional ball bearing including both inner and outer rings is not necessary, and the diameter of the larger diameter portion of the shaft can be enlarged by the sum of the thicknesses of the inner and outer rings of the ball bearing, and the diameter of the reduced diameter portion of the shaft can also be enlarged by the thickness of the outer ring of the ball bearing, i.e. generally thick shaft can be obtained.

Accordingly, the blower including the shaft of higher rigidity, good at durability, inhibited in its rotational run-out, and good at stillness can be provided.

Further, the bearing apparatus includes one sleeve served as outer rings and one inner rings fit around the reduced diameter portion of the spindle shaft, so that the number of components of the bearing apparatus can be reduced to decrease the cost therefor.

While particular embodiments of the present invention have been illustrated and described, it should be obvious to those skilled in the art that various changes and modifications can be made without departing from the spirit and scope of the invention.

What is claimed is:

1. A blower having an impeller rotated by means of a motor, comprising:

a base for supporting the motor in a frame, the base provided at a central portion of the frame and supported at the central portion of the frame by means of stays; and a bearing apparatus for supporting a central portion of the impeller, the bearing apparatus including:

a sleeve, a stepped shaft including a larger diameter portion and a reduced diameter portion, a first raceway formed around an outer peripheral surface of the larger diameter portion, a second raceway formed on an inner peripheral surface of the sleeve so as to correspond with the first raceway, balls of a first row interposed between the first and second raceways, an inner ring to the sleeve fit over the reduced diameter portion of the shaft and secured thereto, a third raceway formed around an outer peripheral surface of the inner ring, a fourth raceway formed on the inner peripheral surface of the sleeve so as to correspond with the third raceway, balls of a second row interposed between the third and fourth raceways, and a chamber with front and rear portions formed in the base for accommodating electrical components, the chamber having an opening at the rear portion thereof, wherein the rear opening of the chamber is occluded by a cover detachably mounted on the base.

2. The blower as claimed in claim 1 wherein the balls of the first and the second rows of the bearing apparatus are made of ceramic material.

3. The blower as claimed in claim 1, wherein the rear portion of the chamber is at a downwind side of the blower.

4. The blower as claimed in claim 1, wherein the chamber is formed by the base having a flange extending to form the rear portion from an outer periphery thereof forming a cylindrical body with a closed end.

5. A blower having an impeller rotated by means of a motor, comprising:
- a base for supporting the motor in a frame, wherein the base is provided and supported at a central portion of the frame by means of stays; and
- a bearing apparatus for supporting a central portion of the impeller, the bearing apparatus including:
- a sleeve,
- a stepped shaft including a larger diameter portion and a reduced diameter portion,
- a first raceway formed at an axial position around an outer peripheral surface of the larger diameter portion,
- a second raceway formed on an inner peripheral surface of the sleeve so as to correspond with the first raceway,
- balls of a first row interposed between the first and second raceways,
- an inner ring to the sleeve fit over the reduced diameter portion of the shaft and secured thereto,
- a third raceway formed around an outer peripheral surface of the inner ring.
- a fourth raceway formed on the inner peripheral surface of the sleeve so as to correspond with the third raceway,
- balls of a second row interposed between the third and fourth raceways, and
- a chamber with front and back portions formed in the base for accommodating electrical components, wherein the back portion of the chamber is sealed by a removable cover,
- wherein the chamber is formed by the base having a flange extending to form the back portion from an outer periphery thereof forming a cylindrical body with a closed end, the chamber having a rear opening at the back portion thereof, and wherein the rear opening of the base is occluded by the cover detachably mounted by screws on the base.

* * * * *